(12) United States Patent
Mabuchi et al.

(10) Patent No.: US 6,407,774 B1
(45) Date of Patent: *Jun. 18, 2002

(54) ADAPTER DEVICE FOR INTERCHANGEABLE LENS OF CAMERA WHICH CONVERTS CAMERA DATA FORMAT TO LENS DATA FORMAT

(75) Inventors: Toshiaki Mabuchi, Tokyo; Seiya Ohta, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/416,924

(22) Filed: Apr. 4, 1995

Related U.S. Application Data

(63) Continuation of application No. 08/102,104, filed on Aug. 4, 1993, now abandoned, which is a continuation of application No. 07/780,718, filed on Oct. 21, 1991, now abandoned.

(30) Foreign Application Priority Data

Oct. 25, 1990 (JP) ............................................. 2-285788
Feb. 28, 1991 (JP) ............................................. 3-034751

(51) Int. Cl.⁷ .............................................. H04N 5/225
(52) U.S. Cl. ........................... 348/335; 348/360; 396/71
(58) Field of Search ................................. 348/207, 363, 348/364, 366, 367, 335, 360, 361, 375, 373, 220, 340; 354/286; 396/71; H04N 5/238

(56) References Cited

U.S. PATENT DOCUMENTS

| | | | | |
|---|---|---|---|---|
| 4,572,638 A | * | 2/1986 | Nakai et al. | 396/71 |
| 4,733,258 A | * | 3/1988 | Kojima | 390/71 |
| 4,758,854 A | * | 7/1988 | Saegusa | 390/71 |
| 5,036,399 A | * | 7/1991 | Mubuchi | 348/351 |
| 5,053,798 A | * | 10/1991 | Ohara et al. | 396/71 |
| 5,087,978 A | * | 2/1992 | Hieda | 348/363 |
| 5,877,811 A | * | 3/1999 | Iijima et al. | 348/375 |

* cited by examiner

Primary Examiner—Tuan Ho
(74) Attorney, Agent, or Firm—Robin, Blecker & Daley

(57) ABSTRACT

An adapter device for an interchangeable lens of a camera having a signal conversion circuit for converting an automatic exposure control signal generated from the output from a video signal processing circuit of a video camera which is capable of performing an automatic exposure control into an automatic exposure control signal which is adapted to an interchangeable lens system for a still camera capable of performing an automatic exposure control.

26 Claims, 10 Drawing Sheets

| LEVEL DIFFERENCE | GREATER THAN OF EQUAL TO +3EV | +2EV | +1EV | REFERENCE | -1EV | -2EV | -3EV | -4EV | -5EV | LESS THAN -5EV |
|---|---|---|---|---|---|---|---|---|---|---|
| COMMUNICATION DATA (DECIMAL) | 255 | 128 | 64 | 32 | 16 | 8 | 4 | 2 | 1 | 0 |
| COMMUNICATION DATA (HEXADECIMAL) | FFh | 80h | 40h | 20h | 10h | 8h | 4h | 2h | 1h | 0h |

FIG. 8

| LOWER\UPPER | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0* | 128 | 64 | 32 | 27 | 24 | 22 | 19 | 17 | 16 | 14 | 13 | 12 | 11 | 10 | 10 | 9 |
| 1* | 8 | 7 | 7 | 6 | 5 | 5 | 4 | 4 | 3 | 3 | 2 | 2 | 1 | 1 | 1 | 0 |
| 2* | 0 | 0 | 0 | 1 | 1 | 1 | 2 | 2 | 2 | 2 | 3 | 3 | 3 | 3 | 4 | 4 |
| 3* | 4 | 5 | 5 | 5 | 5 | 6 | 6 | 6 | 6 | 6 | 7 | 7 | 7 | 7 | 7 | 8 |
| 4* | 8 | 8 | 8 | 8 | 8 | 9 | 9 | 9 | 9 | 9 | 9 | 9 | 10 | 10 | 10 | 10 |
| 5* | 10 | 10 | 11 | 11 | 11 | 11 | 11 | 11 | 11 | 12 | 12 | 12 | 12 | 12 | 12 | 12 |
| 6* | 12 | 13 | 13 | 13 | 13 | 13 | 13 | 13 | 13 | 13 | 13 | 14 | 14 | 14 | 14 | 14 |
| 7* | 14 | 14 | 14 | 14 | 15 | 15 | 15 | 15 | 15 | 15 | 15 | 15 | 15 | 15 | 16 | 16 |
| 8* | 16 | 16 | 16 | 16 | 16 | 16 | 16 | 16 | 16 | 16 | 17 | 17 | 17 | 17 | 17 | 17 |
| 9* | 17 | 17 | 17 | 17 | 17 | 17 | 17 | 17 | 18 | 18 | 18 | 18 | 18 | 18 | 18 | 18 |
| A* | 18 | 18 | 18 | 18 | 18 | 18 | 19 | 19 | 19 | 19 | 19 | 19 | 19 | 19 | 19 | 19 |
| B* | 19 | 19 | 19 | 19 | 19 | 20 | 20 | 20 | 20 | 20 | 20 | 20 | 20 | 20 | 20 | 20 |
| C* | 20 | 20 | 20 | 20 | 21 | 21 | 21 | 21 | 21 | 21 | 21 | 21 | 21 | 21 | 21 | 21 |
| D* | 21 | 21 | 21 | 21 | 22 | 22 | 22 | 22 | 22 | 22 | 22 | 22 | 22 | 22 | 22 | 22 |
| E* | 22 | 22 | 22 | 22 | 22 | 23 | 23 | 23 | 23 | 23 | 23 | 23 | 23 | 23 | 23 | 23 |
| F* | 23 | 23 | 23 | 23 | 23 | 23 | 23 | 23 | 24 | 24 | 24 | 24 | 24 | 24 | 24 | 24 |

ADAPTER DEVICE FOR INTERCHANGEABLE LENS OF CAMERA WHICH CONVERTS CAMERA DATA FORMAT TO LENS DATA FORMAT

This is a continuation application under 37 CFR 1.62 of prior application Ser. No. 08/102,104, filed Aug. 4, 1993, abandoned, which is a continuation of Ser. No. 07/780,718, filed Oct. 21, 1991, abandoned.

BACKGROUND OF THE INVENTION

1. Field of the Invention

The present invention relates to an adapter for an interchangeable lens, for establishing a connection between a video signal processing system for a video camera capable of automatically controlling exposure and an interchangeable lens system for a still camera capable of automatically controlling exposure.

2. Related Background Art

Recently, there has been disclosed a lens system for a video movie system, which is different from an ordinary system composed of integrating a camera and a lens and which is capable of using a variety of interchangeable lenses. As an interchangeable lens system of the type described above, a system for a still camera such as a single-lens reflex camera has been known and a variety of lenses including special lenses for a variety of purposes have come into the market. However, since use of the interchangeable lens system is in the early stage and therefore its market has not been established yet, it is not practical that a variety of special lenses which characterizes the interchangeable lens system are manufactured in the early stage of the promotion of the video movie system. Therefore, it is effective to utilize the conventional interchangeable lenses for a still camera for a single-lens reflex camera. In a case where the video movie camera and the interchangeable lens for a still camera are connected to each other, a conversion adapter must be used because of the following reasons (a) to (c):

(a) Since the mount for the interchangeable lens system for the video movie and that for the interchangeable lens system for the still camera are different from each other, a proper adaptation means for them must be employed.

(b) Since the video movie camera and the still camera have different distances between the imaging surface and mount position, the difference in the optical passage must be aligned.

(c) Since the interchangeable lens system for the video movie and the interchangeable lens system for the still camera have different communication formats for transmitting/receiving various data required to perform the control and as well as the data format/control format are different, they must be adapted to each other.

The video movie camera and the still camera are respectively arranged to be significantly different from each other in their status, the imaging status and the functions. Therefore, also the AE (Automatic Exposure) control method is different between the video camera and the still camera. Then, the AE control method will now be described schematically.

First, the AE control method employed in a conventional camera integrated type VTR will now be described with reference to FIG. 1. Imaging light made incident through a lens optical system 1 is first subjected to a light quantity adjustment in an iris diaphragm 2 before an image of a subject is formed on an image pickup element 3, the image of the subject being then photoelectrically converted on the image pickup element 3. A signal obtained from the image pickup element 3 is converted into a TV composite video signal by a camera signal processing circuit 4 and a camera encoder 5 before it is transmitted to outside. At this time, brightness signal Yγ obtained from the camera signal processing circuit 4 is subjected to an integral process in an integrator 6 before a differential signal denoting the level difference from a reference level supplied from a reference value generating circuit 19 is generated by a calculator 18. The differential signal thus-generated is, as an AE control signal, transmitted to a driver 13 so that the iris diaphragm (a diaphragm mechanism for adjusting exposure) is controlled via an actuator 14.

Then, an AE control method employed in a VTR of an interchangeable lens method will now be described with reference to FIG. 2. Referring to FIG. 2, a right portion with respect to a mount portion MT designated by a central alternate long and short dash line forms a camera unit CM, while the left portion forms a lens unit LS. An image of a subject formed on an imaging surface of the image pickup element 3 after it has passed through the iris diaphragm 2 is photoelectrically converted by the image pickup element 3 before it is transmitted as an image signal. The image signal supplied to the camera signal processing circuit 4 from the image pickup element 3 is subjected to a γ (gamma) conversion or the like so that it is fetched as a video signal composed of color signal C and brightness signal Yγ before it is, in the form of a composite video signal, transmitted outside from a camera portion via camera encoder 5 arranged to act in accordance with the NTSC method. The brightness signal Yγ transmitted from the above-described camera signal processing circuit is supplied to the integrator 6, an amplifier (AMP) 7 and a DC level shift circuit 8 which constitute an AE circuit so that the AE control signal for controlling the iris diaphragm 2 in such a manner that proper exposure can be obtained is generated. In the above-described AE circuit, the brightness signal Yγ is integrated by the integrator 6 before it is amplified to a predetermined level by the amplifier 7. Then, the amplified signal is made to be the above-described reference level by a DC level shift circuit 8. A method of setting AE control data in accordance with the level difference from the above-described reference level is, as described later, arranged in such a manner that the amplifier 7 and the DC level shift circuit 8 are adjusted so as to generate communication data, for example, as shown in FIG. 3, in accordance with the brightness difference of the received signal. A signal generated in the AE circuit is converted into a digital signal by an A/D converter 9 before it is supplied to a microcomputer 10 for the camera so as to be transmitted to the lens unit LS as the AE control signal via a data communication passage 21 at predetermined timing. At this time, the data communication passage 21 is connected to a microcomputer 11 for the lens so that all of communication data items are received by the microcomputer 11 for the lens before the communication data is converted into an analog signal by a D/A converter 12. Then, the analog signal is supplied to the driver circuit 13. Then, the iris diaphragm 2 is controlled via the actuator 14. FIG. 3 is a table which illustrates representative value of AE control data to be transmitted to the lens unit LS which is assigned by, for example, 8 bits (256 steps). As shown in FIG. 3, each level difference is expressed by an EV (diaphragm) value such that an instruction is made in a case where the value is+1 EV to perform a diaphragm of 1 EV (so-called "for one diaphragm") with respect to the optimum exposure. Furthermore, a reference value for the AE control is determined to be 32 in this case and the action of the iris is inhibited. In the portion including the lens, control data transmitted from the portion including the camera is again converted into an analog signal by the D/A converter 12 so as to drive the actuator 14 via the driver 13. As a result, the iris diaphragm 2 is operated. As described above, the control signal including a control signal for stopping the operation of the iris in accordance with the level of the video signal is, as AE control information, formed into a digital code so as to be transmitted. Therefore, the apparent gain different of the camera can be neglected and as well as the difference in the dynamic range of the camera can be made to be regardless. Furthermore, since the reference values are unified in accordance with a predetermined code, compatibility can be maintained as desired.

Finally, the AE control method employed in a still camera will now be described with reference to FIG. 4. Imaging light made incident upon the lens optical system 1 is first subjected to a process in which the quantity of light is adjusted by the iris diaphragm 2 similarly to the above-described structure. Then, it is supplied to a photometry element 3A for performing a part and average photometry and a photometry element 3B for performing a spot photometry. The outputs from the photometry elements 3A and 3B are respectively amplified by the amplifiers 7A and 7B before they are supplied to a photometry circuit 23. In the photometry circuit 23, a photoelectric current is converted into voltage obtained by logarithmic compression so as to be supplied to the microcomputer 10 for the camera. In the microcomputer 10 for the camera, an exposure calculations for obtaining the proper exposure is performed in accordance with a variety of AE modes (the shutter priority AE mode, the diaphragm priority AE mode, depth priority AE mode). The result of the above-described calculations are obtained as a value which corresponds to the difference between the photographic diaphragm and an open diaphragm, that is, the number of diaphragm steps. The number of diaphragm steps thus-obtained is supplied to the microcomputer 11 for the lens included in the lens unit LS via the data transmission passage 21.

The number of diaphragm steps supplied from the portion including the camera is converted into the number of steps of a stepping motor (M) 20. As a result, a stepping motor 14 is rotated via the driver 13 in accordance with the number of steps. As a result, the iris diaphragm 2 is opened/closed so that exposure is controlled. At this time, the relationship between the stepping motor 20 and the iris diaphragm 2 is arranged in such a manner that the diaphragm is changed by, for example, ⅛ step when the rotor of the stepping motor 14 is rotated by one pitch.

According to the control method thus-constituted, the AE control method employed in the interchangeable lens system for the video movie camera is arranged in such a manner that the difference between the present light quantity and the reference light quantity is transmitted to the lens portion. In the lens portion, the diaphragm mechanism is driven in an analog manner from the present position in accordance with the difference value thus-transmitted so that the light quantity is controlled. Finally, a control is performed in such a manner that the reference light quantity and the actual incidental light quantity are made to be the same. On the other hand, the AE control method for the interchangeable lens system for the still camera is arranged in such a manner that the difference between absolute value information about the present diaphragm in the camera portion and absolute value information about the desired diaphragm is converted in accordance with the drive means (for example, the number of pulses of the pulse motor) for the lens. Then, data obtained by the above-described conversion is transmitted to the lens portion before the lens portion controls the light quantity by driving the diaphragm mechanism by an instructed number of the pulses in a digital manner so that a diaphragm (quantity of light) required by a user is realized. Therefore, AE control data from the camera in the interchangeable lens system for the video movie camera cannot be directly used as AE control data for controlling the interchangeable lens in the interchangeable lens system for the still camera. Therefore, there arises a problem in that the AE control cannot be performed.

SUMMARY OF THE INVENTION

To this end, an object of the present invention is to provide an adapter device enabling a lens system except for a lens system for a video camera, for example, a lens system for a still camera to be connected to a video camera.

Another object of the present invention is to provide an adapter for an interchangeable lens for a camera capable of enabling two different AE control methods to match with each other, enabling an interchangeable lens of an interchangeable lens system for a still camera to be used in an interchangeable lens system for video camera, and satisfactorily performing an AE control.

In order to achieve the above-described object, according to one aspect of the present invention, there is provided a conversion adapter device for establishing a connection between the body of a camera and a lens unit each having different control methods, the conversion adapter device comprising: signal receiving means for receiving a control signal transmitted from the body of the camera; computing means for converting the form of the control signal thus-received into a form which matches with the control method for the lens unit; and transmission means for transmitting a signal denoting the result of computing transmitted from the computing means to the lens unit.

According to another aspect of the present invention, there is provided a conversion adapter device for a camera comprising signal conversion means for converting an automatic exposure control signal generated from the output from a video signal processing circuit of a video camera which is capable of performing an automatic exposure control into an automatic exposure control signal which is adapted to an interchangeable lens system for a still camera capable of performing an automatic exposure control.

As a result of the function of the signal conversion means, the interchangeable lens for the still camera can be used similarly to a manner for using the interchangeable lens for the video camera when viewed from the video camera. Therefore, the difference in the lens can be overcome. Furthermore, interchangeable lens for the still camera acts as if it processes data supplied from the still camera so that it can be used while eliminating a necessity of modifying it to serve as the lens.

A third object of the present invention is to provide an adapter for an interchangeable lens of a camera capable of performing a proper control regardless of the difference in the characteristics of each lens unit when the body of the camera and the lens unit are coupled to each other via the adapter in a case where there are a plurality of kinds of the control portion for the lens unit.

In order to achieve the above-described object, according to another aspect of the present invention, there is provided a conversion adapter device for an interchangeable lens system capable of attaching/detaching a lens portion to and from a camera portion, the conversion adapter device for an interchangeable lens system comprising a plurality of conversion means for converting information about the operational position of exposure control means in the lens portion into a form which can be discriminated by the camera portion when the camera portion and the lens portion have different exposure discrimination methods for discriminating the the operational status of the exposure control means; and selection means for selecting any one of a plurality of the conversion means in accordance with specific information about the lens.

As a result of the signal conversion means for the above-described adapter, conversion methods which have been adjusted and adapted to each actuator are respectively provided so as to be selectively used so that a variety of controls such as the AE control of a variety of lenses can be performed in a case where a variety of lenses each having different formats are used.

A fourth object of the present invention is to provide a conversion adapter device for an interchangeable lens arranged in such a manner that it has a plurality of data conversion tables for forming drive information which corresponds to the difference in the characteristics of the lens drive portion and the adapter portion selects a proper conversion table in accordance with information about the connected lens, whereby a proper AE control can be performed for the attached lens and therefore an excellent image quality can be obtained even if any one of a variety of lenses is attached.

Other and further objects, features and advantages of the invention will be appear more fully from the following description.

BRIEF DESCRIPTION OF THE DRAWINGS

FIG. 8 illustrates an example of a conversion table shown in FIG. 1;

THE DETAILED DESCRIPTION OF THE PREFERRED EMBODIMENTS

Figure 5:
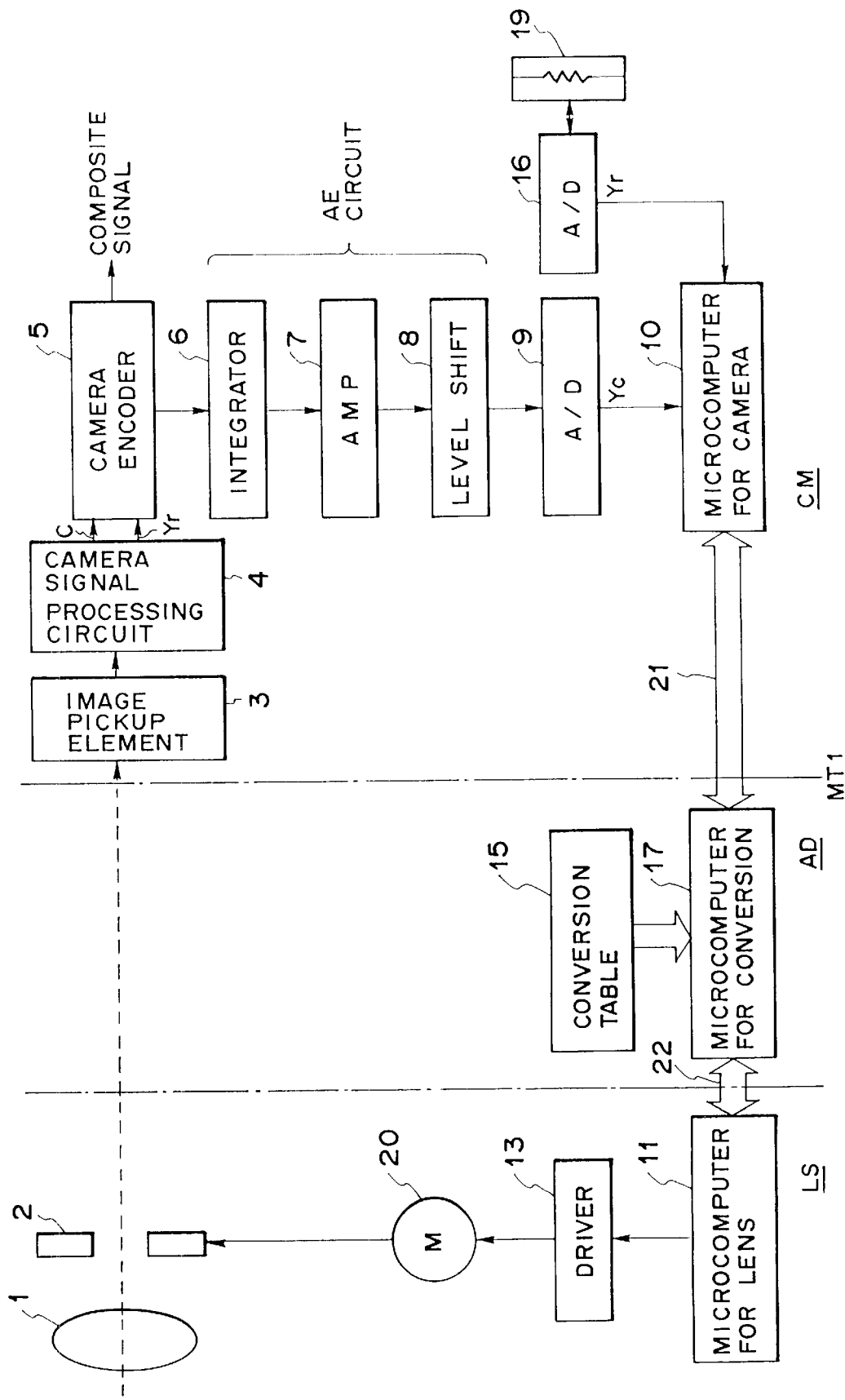
FIG. 5 is a block diagram which illustrates the structure of an embodiment of the present invention.

FIG. 5 is a block diagram which illustrates the structure of an embodiment of the present invention, where the same elements as those according to the above-described conventional example are given the same reference numerals and their descriptions are omitted here. Referring to FIG. 5, portions sectioned by mount portions MT1 and MT2 respectively designated by two alternate long and two short dash lines are arranged, when viewed from the right, to be a camera unit CM, a conversion adapter AD and a lens unit LS having microcomputers 10, 17 and 11, respectively. A signal conversion means is constituted in which an AE control signal generated from an output signal from a video signal processing circuit (composed of a camera signal processing circuit 4, a camera encoder 5 and the like) of a video movie camera (the camera unit CM), which is capable of performing an AE control and an AF (automatic focusing) control, is, by a conversion microcomputer 17 for the conversion adapter AD, converted into an AE control signal which is adaptable to an interchangeable lens system (the system for the lens unit LS) for a still camera which is capable of performing an AE control and an AF control.

Figure 7:
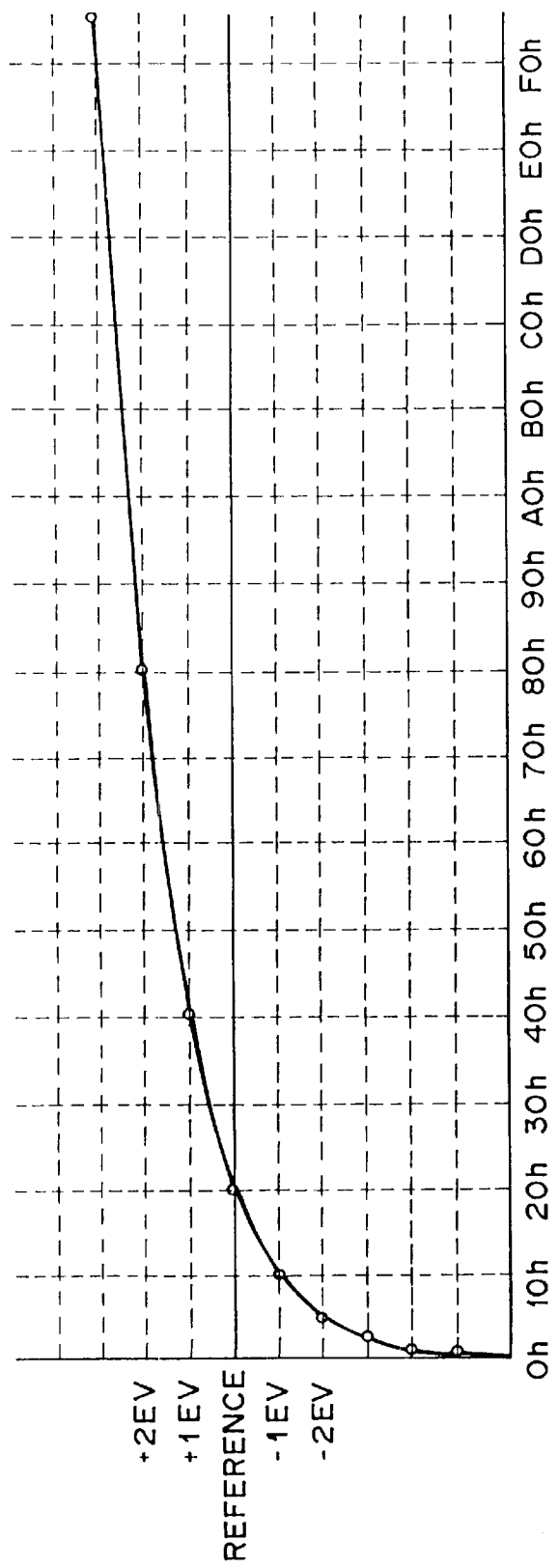
FIG. 7 illustrates the relationship between data for controlling the iris and EV values.

In the above-described camera unit CM, an AF control signal finally generated in the AE circuit by a method similar to that shown in FIG. 7 is converted into a digital signal by an A/D converter 9. Then, it is supplied to a microcomputer 10 for the camera so as to be subjected to ensuing data process. At this time, the output denoting the reference level from a reference value generating circuit 19 is received by a microcomputer for the camera as reference value Yr via an A/D converter 16 so as to be calculated together with output Yc transmitted from an A/D converter 9. The calculation is performed as follows:

$$Di=(Yc-Yb)/(Yr-Yb)\times Dc \tag{1}$$

where

Di: AE control data (Diris)

Yc: AE control signal supplied to the microcomputer for the camera

Yr: Yc level at the time of the reference level

Yb: Yc level at the time of stopping light from the image pickup element

Dc: AE control data (central value) at the time of the reference level

Figures 1, 3:
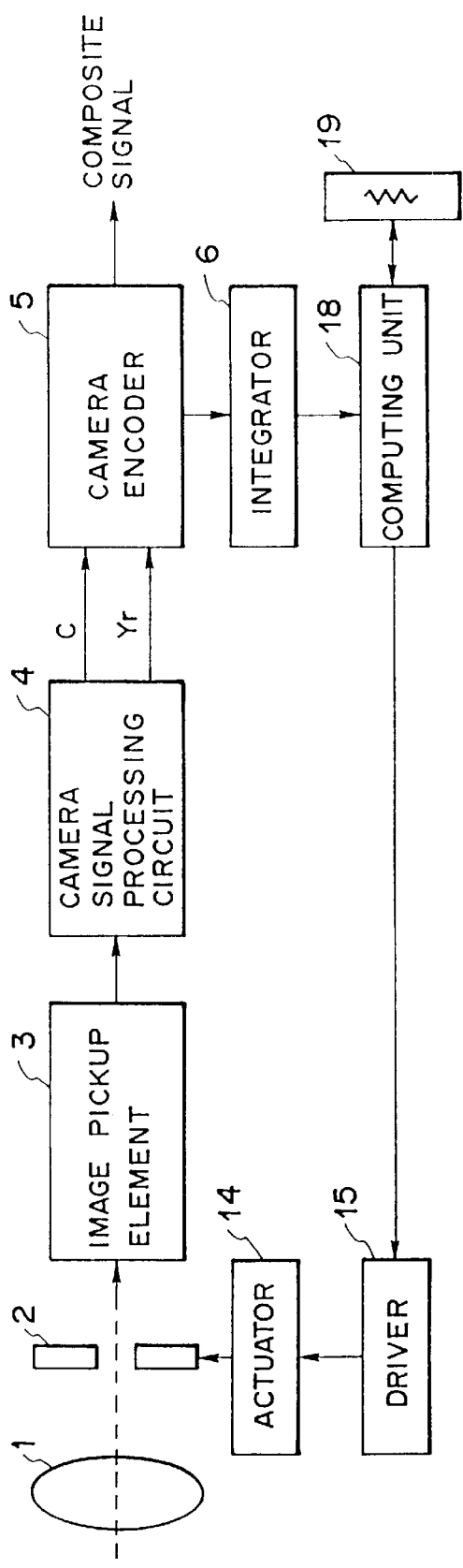
FIG. 1 is a block diagram which illustrates the structure of a camera integrated VTR.
FIG. 3 illustrates the relationship between video signals and data for controlling an iris in the VTR shown in FIG. 2.
Figure 2:
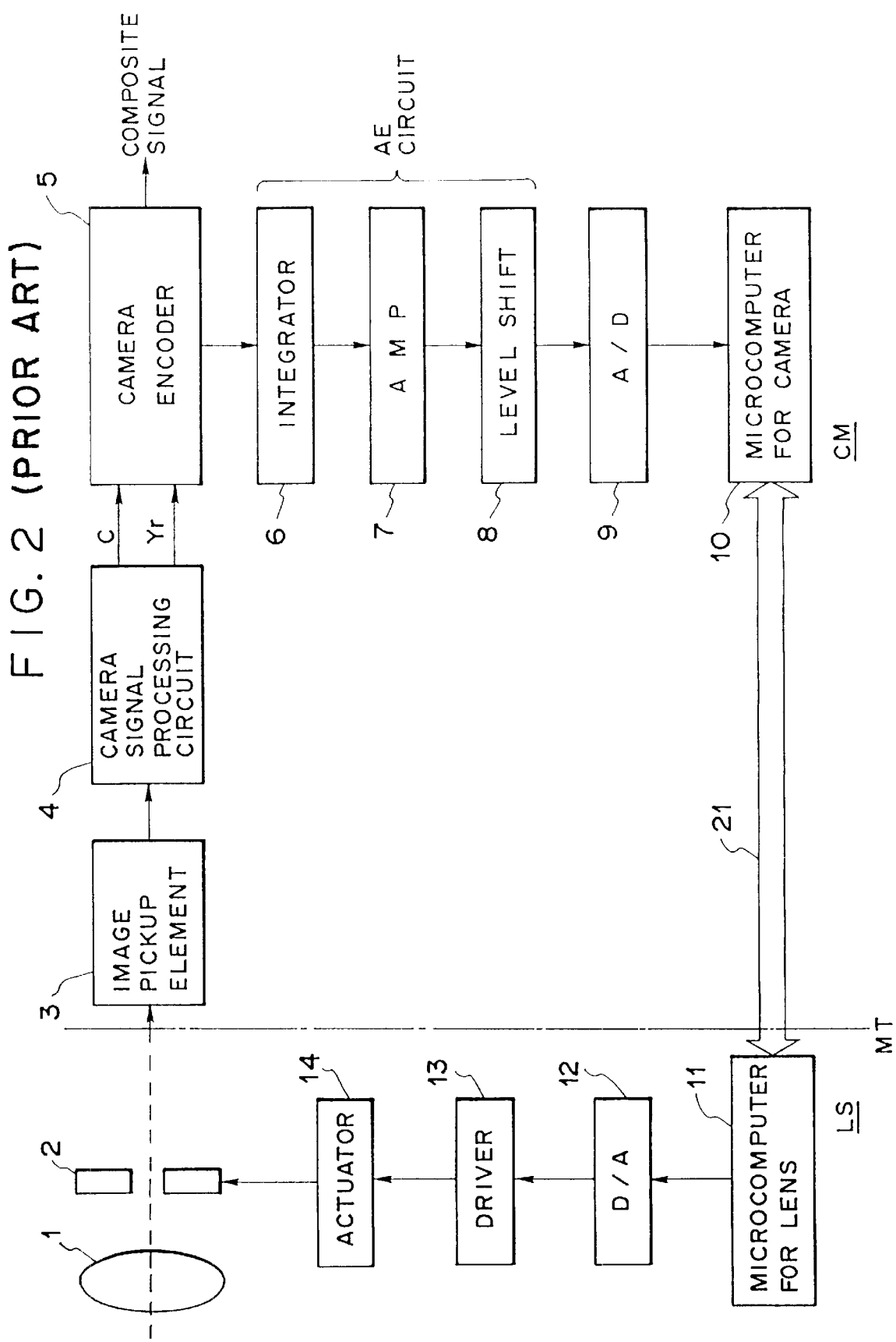
FIG. 2 is a block diagram which illustrates the structure of an interchangeable lens type VTR.
Figure 4:
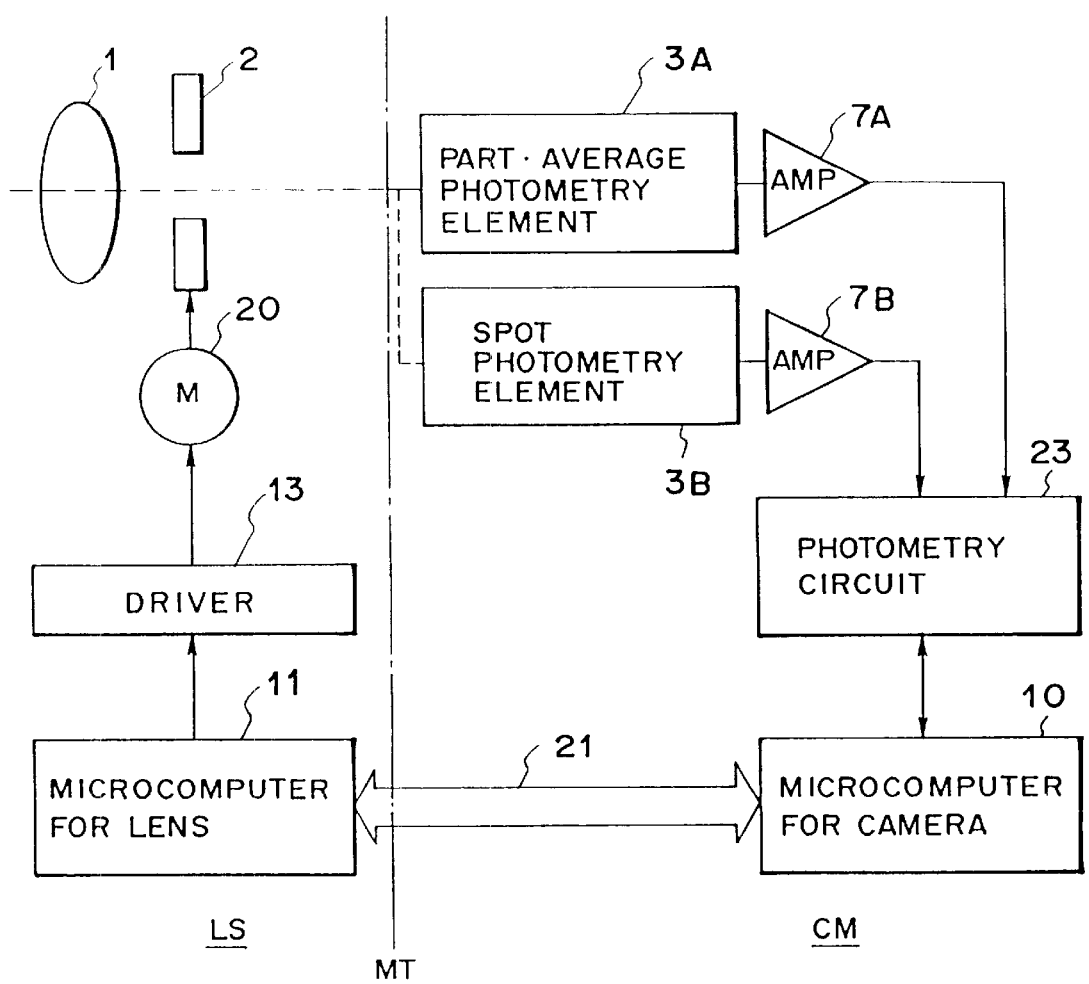
FIG. 4 is a block diagram which illustrates the structure of a still camera.

AE control data Di thus-calculated is transmitted as an AE control signal at predetermined timing to the conversion adapter AD via the data communication passage 21. At this time, the data communication passage 21 is connected to the conversion microcomputer 17 for the conversion adapter via a direct contact (omitted from illustration) of the mount portion MT1. Therefore, all of communication data items are temporarily received by the conversion microcomputer 17. In a case where the above-described control data to be transmitted is assigned by, for example, 8 bits (256 steps), an assumption is made here that the representative value (Dc) is 32 upon consideration of general characteristics of the video signal and the iris diaphragm 2. Each representative value is as shown in FIG. 3. Referring to FIG. 3, each level difference is expressed by an EV value such that an instruction is made in a case where the value is+1 EV to perform a diaphragm of 1 EV (so-called "one diaphragm") with respect to the optimum exposure. Furthermore, a reference value for the AE control is determined to be 32 in this case and the action of the iris 2 is inhibited. The above-described AE control data Di (Diris) is determined in accordance with communication data transmitted from the body of the camera while taking the level difference, the sign of the control direction and the like into a consideration.

Figure 6:
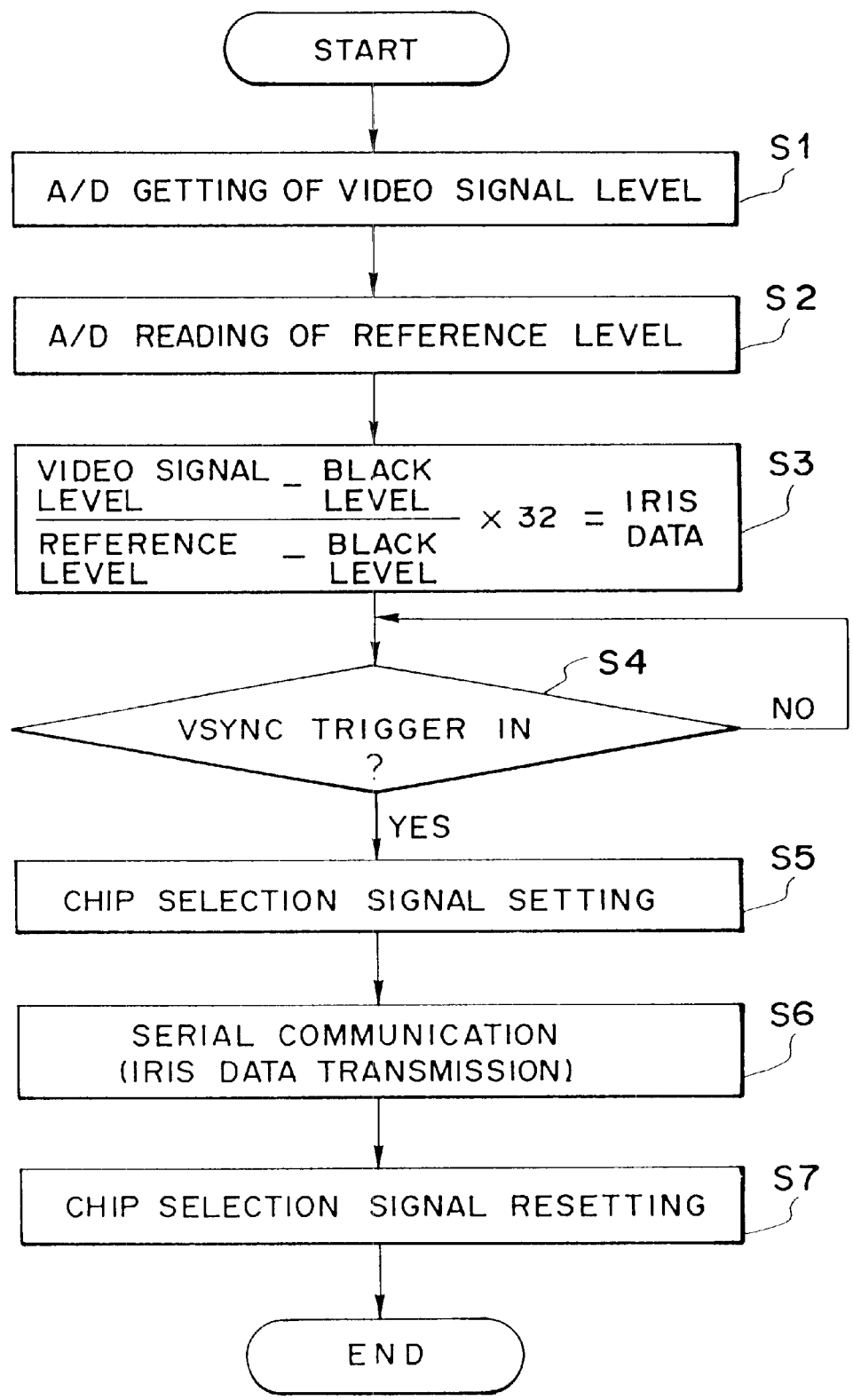
FIG. 6 is a flow chart which illustrates an operation performed in a camera unit shown in FIG. 5.

FIG. 6 is a flow chart which illustrates a schematic operation performed by the above-described camera unit.

Specifically, FIG. 6 illustrates the process performed by the microcomputer for the camera.

First, an output denoting the video signal level transmitted from the AE circuit is, via the A/D converter 9, received in step S1. Simultaneously, the output denoting the reference level transmitted from the reference value generating circuit 19 is read via the A/D converter 16 in step S2. In step S3, the calculation (video signal level—black level)/(reference level—black level)×32 expressed in Equation (1) is performed so that AE control data Di is obtained. Then, in step S4, a moment of supply of a certain number of Vsync (video vertical synchronizing signal) is waited for. In response to the supply of it, a chip select signal is set in step S5. Then, in step S6, AE control data Di is subjected to parallel-to-series conversion so as to transmit (serial-transmit) it from the camera unit CM to the conversion adapter AD. In step S7, the above-described chip select signal is reset.

As described above, information for performing the AE control is processed in the camera unit CM. The conversion microcomputer 17 included by the conversion adapter A must convert its data into data about the absolute diaphragm difference which can be used in the lens unit LS in accordance with AE control data (relative difference data) processed in the camera portion as described above and transmitted via the data communication passage 21. The relationship between AE control transmission data and the EV values shown in FIG. 3 can be expressed by a graph shown in FIG. 7. The conversion means for use in this process may, of course, be structured by an arithmetic expression formed by converting FIG. 7. However, it is disadvantageous that the microcomputer performs the complicated calculations in the viewpoint of the performance and the cost of the microcomputer. Therefore, it is practical to employ a structure which is arranged in such a manner that values which have be en previously obtained by calculations (or from a graph) are possessed in the form of a conversion table 15 shown in FIG. 8. The table shown in FIG. 8 shows the number of drive pulses for a diaphragm pulse motor or the like with respect to control instructed values specified by upper digits 0* to F* and the lower digits 0 to F. FIG. 8 illustrates the conversion table 15 arranged in a case, for example, where the minimum resolution of the diaphragm drive mechanism of a lens group for an interchangeable lens system for a still camera is set to ⅛ step of one diaphragm (=1 EV) (in a case where a pulse motor is used, the diaphragm is changed by ⅛ step when the pulse motor is rotated by a degree corresponding to one pulse and the same is changed by one diaphragm, that is, 1 EV when the pulse motor is rotated by a degree corresponding to 8 pulses), where the number of pulses shows,only the absolute values.

Data about the number of pulses obtained from FIG. 8 is transmitted to the lens portion as the AE control signal via the data communication passage 22. At this time, the data communication passage 22 is connected to the microcomputer 11 for the lens via a direct contact (omitted from illustration) of the mount portion MT2. Therefore, all of communication data items are temporarily received by the microcomputer 11 for the lens.

Figure 9:
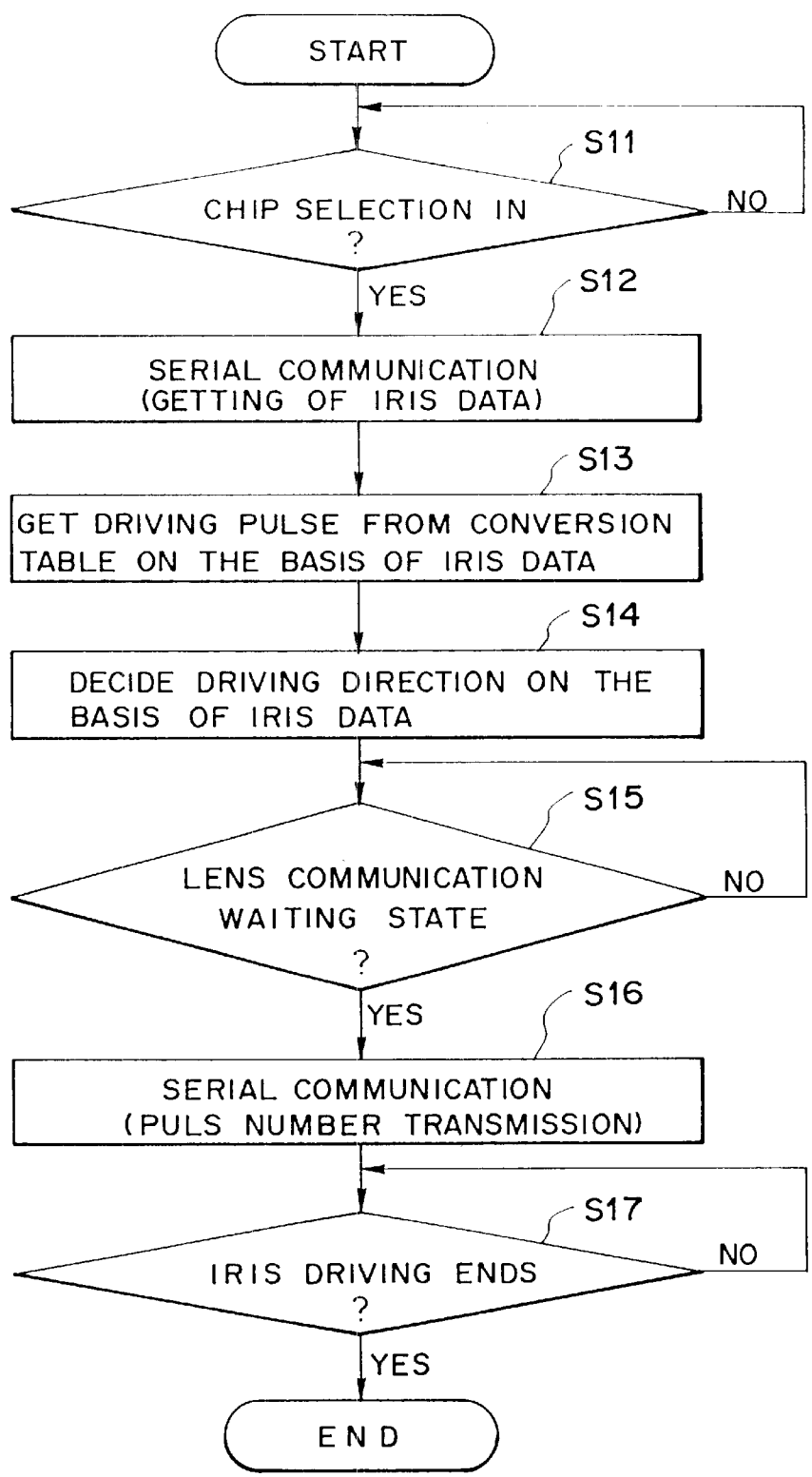
FIG. 9 is a flow chart which illustrates an operation performed by a conversion adapter.

FIG. 9 is a flow chart which illustrates a specific process performed by the above-described conversion adapter. Specifically, FIG. 9 illustrates a process performed by the conversion microcomputer 17.

First, in step S11, the input of the chip select to the microcomputer 17 is confirmed. If the select has been made, AE control data is, in step S12, subjected to direct-to-parallel conversion so as to receive it. Then, in step S13, the above-described number of drive pulses is obtained from the conversion table 15 in accordance with the above-described fetched data. In step S14, whether or not it is larger than the reference value is examined in accordance with the above-described data so as to determine the direction of rotation of the pulse motor (the stepping motor 20). In step S15, whether or not the lens portion is in the communication waiting state is confirmed. If it is in the communication waiting state, the flow proceeds to step S16 in which data about the above-described number of the drive pulses and data about the driving direction are subjected to the parallel-to-series conversion so as to transmit it from the conversion adapter AD to the lens portion in a serial manner. Then, in step S17, the drive in the lens portion is confirmed.

As described above, information for AE control is converted in the conversion adapter AD. At this time, the above-described process has been performed by the conversion adapter AD of the lens unit LS, data transmitted from the conversion microcomputer 17 via the data transmission passage 22 shows any difference from data transmitted from the still camera (in its status). Therefore, an operation within a range of an ordinary process is performed.

As described above, the relative drive value for the AE control transmitted from the video camera to the conversion adapter is converted into the absolute drive value capable of controlling (driving) the interchangeable lens group for the still camera. Therefore, the two different AE control methods can be matched with each other.

As a result, the interchangeable lens for the interchangeable lens system for the still camera can be used in the interchangeable lens system for the video camera. Consequently, an effect can be obtained in that the AE control can be performed as desired.

As described above, according to this embodiment, an adapter device can be achieved which enables a lens unit except for that for the video camera and having a different control format from that of the lens unit for the video camera such as a lens unit for a still camera to be coupled to the body of a video camera.

Then, a second embodiment of the present invention will now be described in which the above-described adapter device is further improved and arranged to be capable of overcoming not only the difference in the control format but also the difference in the characteristics of each lens unit.

That is, in a case where the lens unit for a still camera is connected to a video camera by using the conversion adapter device, the exposure control (hereinafter called an "AE") is performed in such a manner that the AE control signal denoting the brightness level and transmitted from the video signal processing circuit of a video camera which is capable of performing the AE control is converted into the AE control signal which is adapted to the interchangeable lens system for the still camera capable of performing the AE control. Furthermore, the signal conversion means having a conversion means for calculating and converting the amount of drive of the diaphragm, that is, an adapter is used to control the AE control.

However, there is a risk of generation of the following problems when the above-described control is performed because there are a variety of interchangeable lenses which are attached via the adapter and the actuators for driving the diaphragm have non-uniform characteristics but the AE control is performed by a single conversion method employed in the signal conversion means in the adapter:

(1) The reaction of the AE control is performed quickly or slowly in a non-uniform manner depending upon the type of the lens.

(2) The change in the quantity of light for use in the AE control is too large or too small depending upon the type of the lens.

(3) The diaphragm operation cannot sometimes be controlled smoothly depending upon the type of the lens.

An object of this embodiment is to overcome the above-described problems by providing a conversion adapter device for an interchangeable lens system capable of attaching/detaching a lens portion to and from a camera portion, the conversion adapter device for an interchangeable lens system comprising a plurality of conversion means for converting information about the operational position of exposure control means in the lens portion into a form which can be discriminated by the camera portion when the camera portion and the lens portion have different exposure discrimination methods for discriminating the operational status of the exposure control means; and selection means for selecting any one of a plurality of the conversion means in accordance with specific information about the lens. As a result, even if a variety of lenses each having different formats are used, conversion methods which have been adjusted and adapted to each actuator are respectively provided so as to be selectively used so that a variety of controls such as the AE control of a variety of lenses can be performed.

The structure according to this embodiment is arranged similarly to that according to the first embodiment shown in FIG. 5 but the difference lies in that a plurality of conversion tables are provided in the conversion adapter and its control program.

Again referring to the conversion data table shown in FIG. 8, when the iris is driven by ⅛ diaphragm of one diaphragm (=1 EV), 8-bit control instruction value data (0–255) is changed by 4 to 9 in the diaphragm direction and opening direction. Therefore, the number of drive pulses is zero in a range (dead zone) in which control data is 31 (1F h) to 34 (22 h) as shown in, for example, table shown in FIG. 8 so that the operation of the iris is inhibited. However, when the iris is moved when control data is made to be 32 from 31 in a state where the operation of the iris is inhibited by making the drive pulse to be 0 only at the time of the reference value 32 (20 h), control data exceeds the reference value of 32, for example, it is made to be 35. If the iris is then moved in such a manner that control data is made to be 32 from 35, it is made to be 26 while it exceeds 32. As described above, the iris cannot always be stopped at the reference value of 32. Since the iris 2 is able to encounter hunching as described above, the dead zone is provided in the vicinity of the reference value of 32 in the conversion table.

By changing the range of the dead zone, the responsibility in the AE control and the range of the proper exposure can be changed. A table having a narrow dead zone encounters a fact that the iris quickly reacts and the control is stopped at a position near the proper exposure in comparison to that having a wide dead zone. However, the iris 2 easily encounters hunching in comparison to that having a wide dead zone.

By changing the number of drive pulses of the conversion table which corresponds to the AE control data, the amount of drive of the AE control can be changed. Although the degree of the drive can be made to be larger in response to one command by enlarging the amount of drive, the quantity of light can undesirably be changed. If the same is too small, the change in the quantity of light can be reduced the amount of drive cannot be enlarged.

As described above, a variety of AE controls can be performed by further providing conversion tables each having different regions (dead zones) in which the iris is not changed or conversion tables each having different number of drive pulses which correspond to data.

According to this embodiment, the conversion table group 15 (which includes a plurality of conversion tables according to this embodiment) has the above-described table and a purality of conversion tables which have been previously adapted so as to perform a proper AE control when the camera performs a variety of operations.

The table selected by the camera from the conversion table group is determined in such a manner that the actuator for driving the lens is identified from information about the lens and the adapter selects the conversion table in accordance with the above-described information. Therefore, the camera control status or the AE control which corresponds to the demand of the AE control can be changed.

Data about the number of iris drive pulses selected from the conversion table included by the conversion microcomputer 17 of the conversion adapter shown in FIG. 5 is, as the AE control signal, transmitted to the lens portion via the data communication passage 22. At this time, the data communication passage 22 is connected to the microcomputer 11 for the lens via the direct contact (omitted from illustration) of the mount portion MTA. Therefore, all of communication data items are temporarily received by the microcomputer 11 for the lens. Then, it is, by the lens microcomputer, processed to be formed into a shape which is suitable to drive the iris drive portion in the lens before it is supplied to the driver 13. As a result, the iris drive motor 20 is rotated.

Figure 10:
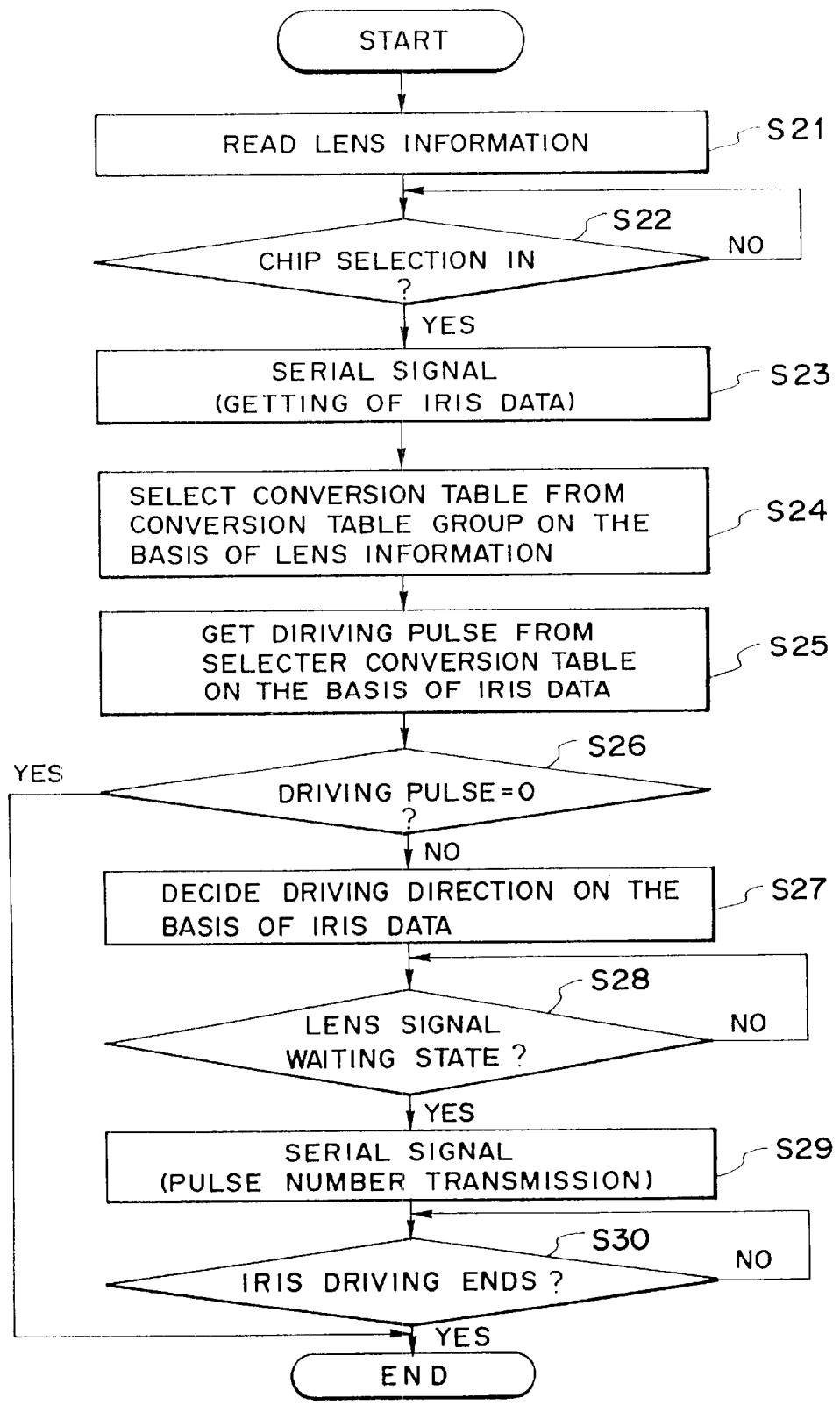
FIG. 10 is a flow chart which illustrates another embodiment of the operation performed by the conversion adapted.

FIG. 10 is a flow chart which illustrates a specific process to be performed by the above-described conversion adapter. Specifically, FIG. 10 illustrates the process to be performed by the conversion microcomputer 17.

In step S21, information about lens is read. In step S22, the input of the chip select of the above-described microcomputer is confirmed. If the same has been selected, AE control data supplied from the camera is received in step S23.

The adapter drives the diaphragm by its signal conversion means so as to make it adapt to the automatic exposure control signal supplied from the camera for the purpose of controlling the iris diaphragm. As the signal conversion means, the above-described conversion table for obtaining the number of pulses for driving the diaphragm is employed to select an actual number of iris drive pulses. In a case where it is obtained in accordance with one conversion table, there sometimes takes place a case in which the automatic exposure control becomes different from a desire depending upon the type of the lens.

Accordingly, the structure is arranged in such a manner that a plurality of conversion tables are provided as the signal conversion means and a conversion table for use in the control in accordance with specific data for the lens is selected. Thus, even if any one of a variety of lenses is selectively attached, a desired automatic exposure control can be performed.

According to the present invention, an actuator for driving the diaphragm which is the subject to be controlled is arranged.

Since actuators are different depending upon the type of the lens, they therefore do not have uniform characteristics. Therefore, there arises a problem in that the actual control becomes different from a desired status depending upon the type of the actuator when the automatic exposure control is performed in accordance with one conversion table.

In order to overcome the above-described problem, the actuator is arranged in such a manner that the type of the actuator for the lens is discriminated in step S24 in accordance with information about the lens read in step S21. Furthermore, a conversion table for, by conversion, obtaining the number of drive pulses for driving the diaphragm which corresponds to the discriminated actuator from the conversion table group 15 is composed of a plurality of conversion tables.

In step S25, the corresponding number of the pulses is obtained from the selected conversion table in accordance with data supplied from the camera. In step S26, it is discriminated whether or not the obtained number of the pulses is "0". If it is not "0", whether or not it is larger than the reference value is examined in accordance with the above-described data in step S27 so that the direction of rotation of the pulse motor (the stepping,motor 20) is determined. If it is "0", the operation of the iris is inhibited. In step S28, whether or not the lens portion is in the waiting status is confirmed. If it is in the waiting status, information about the number of the pulses is transmitted in step S29 before the completion of the operation in the lens portion is confirmed in step S30.

Figure 11:
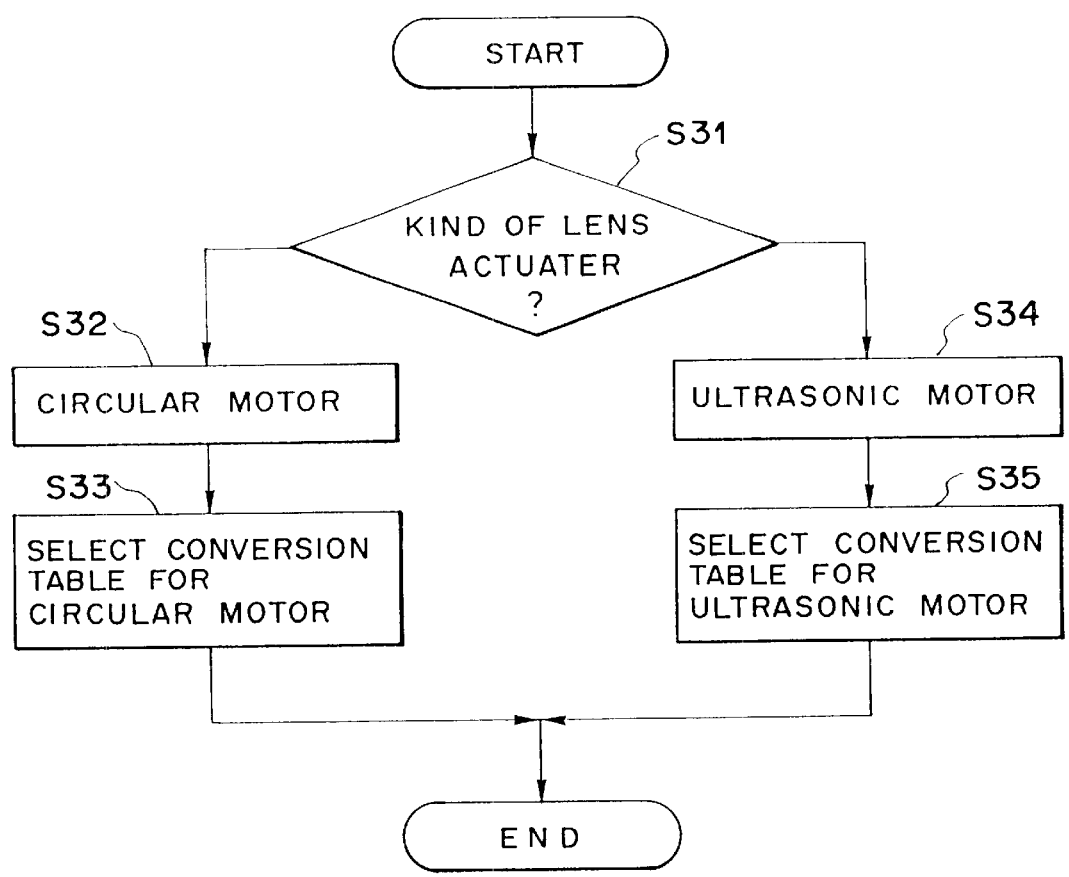
FIG. 11 is a flow chart which illustrates a schematic example of an essential portion of the operation shown in FIG. 10.

FIG. 11 illustrates the specific selecting operation of the conversion table performed in step S24 shown in FIG. 10. In step S31, the actuator is discriminated. If the actuator is formed into, for example, a circular arc shape shown in step S32, a conversion table for the circular arc type motor is selected in step S33. If the actuator is formed into a ultrasonic motor shown in step S34, a conversion table for the ultrasonic motor is selected in step S35 so that a proper control is performed.

As described above, the conversion adapter apparatus for the interchangeable lens system according to the present invention is arranged in such a manner that it has a plurality of data conversion tables for forming drive information which corresponds to the difference in the characteristics of the lens drive portion. Furthermore, the adapter portion selects a proper conversion table in accordance with information about the connected lens. Therefore, even if any one of a variety of lenses is attached, a proper AE control can be performed for the attached lens. Therefore, an excellent image quality can be obtained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A conversion adapted device for establishing a connection between the body of a camera and an accessory which is not operable by said camera because of a control format of a predetermined function being different from that of the same function of said camera, said conversion adapter device comprising:
   (A) signal receiving means for receiving a control signal with the control format of said predetermined function of said camera from said body of said camera;
   (B) computing means, including data format conversion means, for converting said control signal received by said signal receiving means into a digital control signal of said accessory by converting data format of said received digital control signal of said camera into a digital signal data acceptable to the control format of the same function of said accessory; and
   (C) transmission means for transmitting the converted digital control signal from said computing means to said accessory.

2. A conversion adapter device according to claim 1, wherein said lens unit includes a diaphragm and diaphragm control means and said body of said camera includes an exposure detection circuit for detecting an exposure state.

3. A conversion adapter device according to claim 2, wherein control information transmitted from said body of said camera is information about exposure which corresponds to the brightness level, said diaphragm control means includes a step motor for driving said diaphragm and said computing means converts said information about exposure into information about the number of steps of rotation of said step motor.

4. A conversion adapter device according to claim 1, wherein said transmission means communicates data at a frequency of V-sync.

5. A conversion adapter device according to claim 1, further comprising means for correcting the control signal according to kind of an actuator included in said accessory.

6. A conversion adapter device for a video camera in which a still camera's lens unit not operable by a video camera and the video camera unit are attachable to each other and a control format of said lens is different from that of said video camera unit and is not able to communicate with said video camera, comprising:
   format conversion means, for converting a format of an automatic exposure control signal formed to pick up a moving image from an output of a video signal processing circuit of the video camera unit, into a format of an automatic exposure control signal to be used to control the still camera's lens unit attached to said video camera unit, by converting a signal format of the automatic exposure control signal of said video camera that of the automatic exposure control signal of said still camera's lens unit.

7. A conversion adapter device according to claim 6, further comprising means for correcting the control signal according to kind of an actuator included in said lens.

8. A conversion adapter device according to claim 6, wherein said lens unit includes a diaphragm and diaphragm control means and said video camera unit includes an exposure detection circuit for detecting an exposure state.

9. A conversion adapter device according to claim 8, wherein control information transmitted from said video camera unit is information about exposure which corresponds to the brightness level, said diaphragm control means includes a step motor for driving said diaphragm and said computing means converts said information about exposure into information about the number of steps of rotation of said step motor.

10. A conversion adapter device for attaching a lens to a camera which is not able to control said lens because of a control format of said lens being different from that of said camera and being not able to communicate with said lens, and for compensating a difference in a format between said lens and said camera, comprising:
    a plurality of conversion means each for receiving from said lens and converting exposure control information operable by an operation control system of the lens, into exposure control information operable by an operation control system of the camera, according to a different operation format of the lens; and
    selection means for selecting any one of said plurality of conversion means on the basis of information for the operation format of the lens attached to said camera.

11. A conversion adapter device according to claim 10, wherein said camera portion is a video camera for recording moving images.

12. A conversion adapter device according to claim 11, wherein said lens portion is a lens unit for a still camera.

13. A conversion adapter device according to claim 10, wherein each of said plurality of conversion means comprises a microcomputer and converts a control format of said lens into a control format of said camera portion, and wherein there are provided a plurality of conversion means according to an attached lens.

14. A conversion adapter device according to claim 10, wherein said conversion means causes format of an actuator for controlling an iris and a control circuit of said actuator to match with a control format of said camera portion, and wherein there are provided a plurality of conversion means according to the kind of the actuator of said lens portion.

15. A conversion adapter device according to claim 14, wherein said actuator includes at least a step motor and a supersonic motor.

16. A conversion adapter device according to claim 10, further comprising means for correcting the controls information according to kind of an actuator included in said lens.

17. A camera system, comprising:
(a) a camera body;
(b) an accessory which is not operable by said camera because of a control signal format of a predetermined function being different from that of said camera; and
(c) a conversion adapter for mechanically connecting said camera body and said accessory, said conversion adapter comprising conversion means for converting a control signal outputted from said camera body into a digital control signal in the control format which can control said accessory.

18. A camera system according to claim 17, wherein said accessory is a lens unit, and said camera body including image pickup means for photoelectrically converting an object image focused by said lens unit into an image pickup signal and for outputting the image pickup signal and exposure control means for detecting an exposure state according to the level of the image pickup signal outputted from said image pickup means.

19. A camera system according to claim 18, wherein said lens unit includes an iris control motor for control of an iris and said conversion adapter converts an exposure control signal outputted from said exposure control means into a control signal which can control said iris control motor.

20. A camera system according to claim 19, wherein said conversion means comprises a microcomputer.

21. A camera system according to claim 14, wherein said conversion means comprises a memory table which stores a plurality of conversion methods according to the kind of said actuator and said conversion means selects said plurality of conversion methods according to the kind of the attached lens unit.

22. A camera system according to claim 21, wherein said actuator includes a step motor or a supersonic motor.

23. A camera system according to claim 17, wherein said conversion means transmits and receives plural kinds of control information between said camera body and said lens unit synchronously with a vertical scanning frequency (V-SYNC) of a television signal.

24. An optical apparatus which is operable by connecting an optical unit of a master side and an optical unit of a slave side,
wherein a control and driving signal format of said optical unit of the master side is different from that of said optical unit of the slave side and said optical unit of the slave side includes a predetermined function for changing an operation state, and
said optical apparatus comprising a conversion adapter for physically connecting said optical unit of the master side and said optical unit of the slave side and for converting a control signal outputted from said optical unit of the master side into a digital control signal in the control format which can control said optical unit of the slave side.

25. An optical apparatus according to claim 24, wherein said optical unit of the master side includes image pickup means for photoelectrically converting an object image focused by said optical unit of the slave side into an image pickup signal and for outputting the image pickup signal and exposure control means for detecting an exposure state according to the level of the image pickup signal outputted from said image pickup means, and wherein said predetermined function includes a motor for control of an iris and said conversion adapter converts an exposure control signal outputted from said exposure control means into a control signal in the control format which can control said optical unit of the slave side.

26. An optical apparatus according to claim 25, wherein said conversion adapter comprises a microcomputer and a memory table which stores a plurality of conversion methods according to the kind of the actuator, and wherein said conversion adapter selects said plurality of conversion methods according to the kind of said optical unit of the slave side.

* * * * *

UNITED STATES PATENT AND TRADEMARK OFFICE
CERTIFICATE OF CORRECTION

PATENT NO.   : 6,407,774 B1
DATED        : June 18, 2002
INVENTOR(S)  : Toshiaki Mabuchi et al.

It is certified that error appears in the above-identified patent and that said Letters Patent is hereby corrected as shown below:

Column 4,
Line 32, delete "comprising:" and insert -- comprising --.

Column 7,
Line 35, delete "be en" and insert -- been --.
Line 50, delete "shows,only" and insert -- shows only --.

Column 11,
Line 14, delete "stepping,motor" and insert -- stepping motor --.

Column 13,
Line 48, delete "claim 14" and insert -- claim 20 --.

Signed and Sealed this

Fourteenth Day of October, 2003

JAMES E. ROGAN
*Director of the United States Patent and Trademark Office*